(12) United States Patent
Okuyama

(10) Patent No.: US 12,248,213 B2
(45) Date of Patent: Mar. 11, 2025

(54) DISPLAY DEVICE AND DRIVING METHOD THEREOF

(71) Applicant: Japan Display Inc., Tokyo (JP)

(72) Inventor: Kentaro Okuyama, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/605,830

(22) Filed: Mar. 15, 2024

(65) Prior Publication Data

US 2024/0319531 A1    Sep. 26, 2024

(30) Foreign Application Priority Data

Mar. 23, 2023    (JP) .................................. 2023-046143

(51) Int. Cl.
  *G02F 1/1333*    (2006.01)
  *G02F 1/1334*    (2006.01)
  *G02F 1/1343*    (2006.01)
  *G02F 1/1345*    (2006.01)

(52) U.S. Cl.
  CPC ...... *G02F 1/133382* (2013.01); *G02F 1/1334* (2013.01); *G02F 1/134336* (2013.01); *G02F 1/13439* (2013.01); *G02F 1/13454* (2013.01)

(58) Field of Classification Search
None
See application file for complete search history.

(56) References Cited

U.S. PATENT DOCUMENTS

| | | | | |
|---|---|---|---|---|
| 5,886,763 A | * | 3/1999 | Wolkowicz | G02F 1/13452 |
| | | | | 349/161 |
| 6,163,359 A | * | 12/2000 | Smith | G02F 1/133602 |
| | | | | 349/161 |
| 2010/0033654 A1 | * | 2/2010 | Aoki | G09G 3/3611 |
| | | | | 349/161 |

FOREIGN PATENT DOCUMENTS

| | | | | |
|---|---|---|---|---|
| JP | 2006-047455 A | | 2/2006 | |
| JP | 2006047455 | * | 2/2006 | ........... G02F 1/1333 |

* cited by examiner

*Primary Examiner* — Sang V Nguyen

(74) *Attorney, Agent, or Firm* — XSENSUS LLP

(57) ABSTRACT

A display device comprises a display panel including a liquid crystal layer between a pair of substrates and a heater including a plurality of electrodes arranged at a distance from each other and disposed adjacent to the display panel. The plurality of electrodes includes a first electrode heated at a first temperature and a second electrode heated at a second temperature lower than the first temperature. Each of the plurality of electrodes may be a transparent electrode on a transparent substrate.

18 Claims, 14 Drawing Sheets

DISPLAY DEVICE AND DRIVING METHOD THEREOF

CROSS-REFERENCE TO RELATED APPLICATION

This application claims the benefit of priority to Japanese Patent Application No. 2023-046143, filed on Mar. 23, 2023, the entire contents of which are incorporated herein by reference.

FIELD

An embodiment of the present invention relates to a display device and driving method thereof.

BACKGROUND

Conventionally, a liquid crystal display device is used as a display interface for various electronic devices. The liquid crystal display device is a display device that performs on/off control of a plurality of pixels by controlling a voltage applied to a liquid crystal layer interposed between a pair of substrates. Response characteristics of the liquid crystal are greatly influenced by the display quality of the liquid crystal display device. For example, since the viscosity of the liquid crystal increases as the temperature of the liquid crystal becomes lower, the response characteristics of the liquid crystal deteriorate. Specifically, in the case where the liquid crystal display device is used at a low temperature, the response speed of liquid crystal molecules to changes in voltage becomes slow, and there is a problem that switching between the on/off operations of each pixel becomes slow.

In order to solve the above-described problems, an attempt has been made to provide a heater as a mechanism for heating a display panel including a liquid crystal, and to maintain the response characteristics of the liquid crystal even at a low temperature by warming the display panel with the heater. For example, Japanese laid-open patent publication No. 2006-47455 discloses a liquid crystal display device capable of heating a display panel to an appropriate temperature in a short time by juxtaposing transparent heaters combining a transparent substrate and a transparent electrode to a display panel.

SUMMARY

A display device according to an embodiment of the present application comprises a display panel including a liquid crystal layer between a pair of substrates and a heater including a plurality of electrodes arranged at a distance from each other and arranged adjacent to the display panel. The plurality of electrodes includes a first electrode heated at a first temperature and a second electrode heated at a second temperature lower than the first temperature.

A method for driving a display device having a display panel including a liquid crystal layer provided between a pair of substrates and a heater including a plurality of electrodes arranged at a distance from each other and adjacent to the display panel according to an embodiment of the present application, the method comprises applying a smaller voltage to a second electrode of the plurality of electrodes than to a first electrode of the plurality of electrodes.

DESCRIPTION OF EMBODIMENTS

Figure 1:
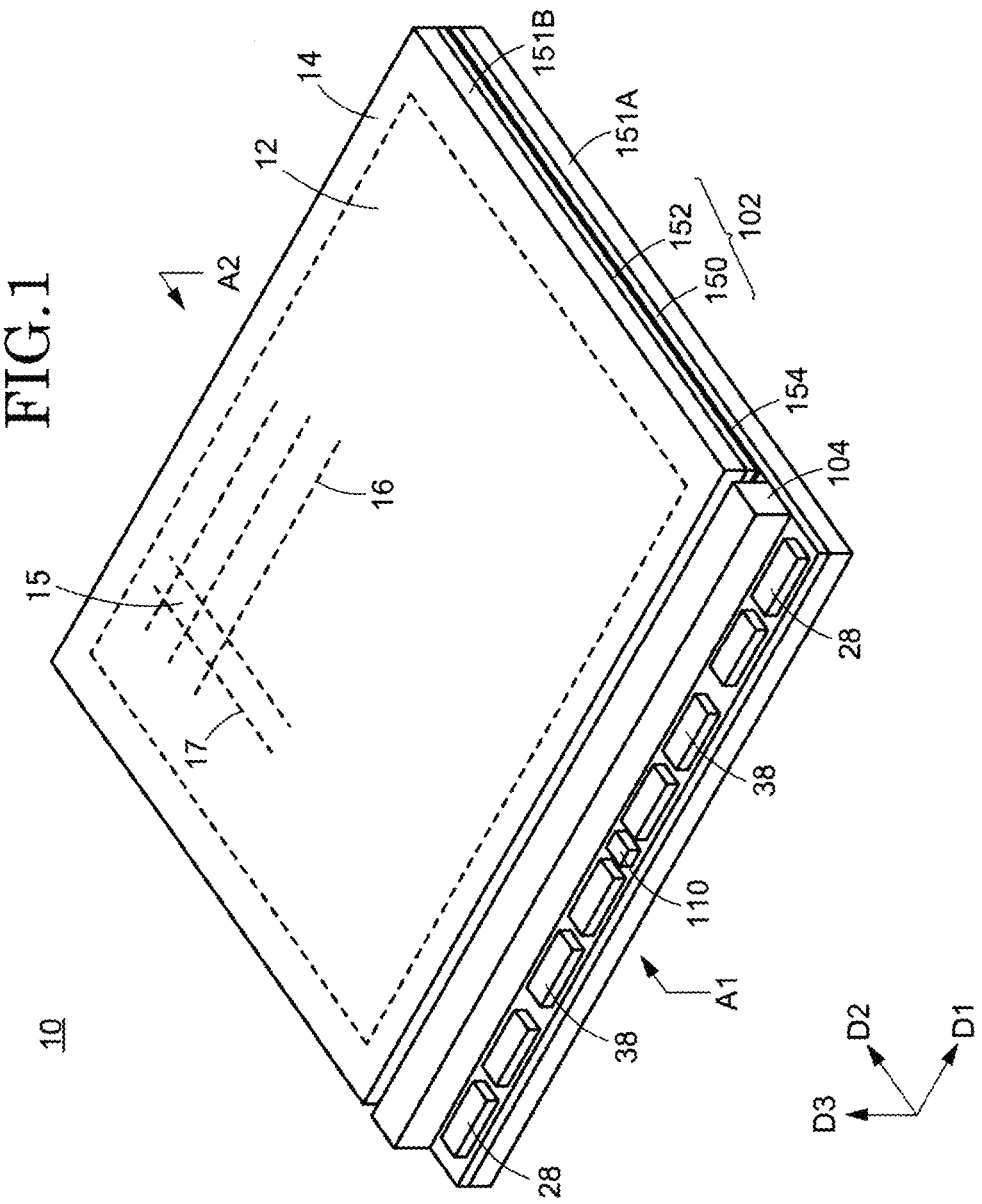
FIG. 1 is a perspective view showing a configuration of a display device according to an embodiment of the present invention.

A liquid crystal display device with a conventional transparent heater allows a display panel to be heated uniformly so that the overall temperature can be raised quickly. However, since there is a heat source such as a driver circuit arranged in a TFT substrate in the actual display panel, if the temperature is raised uniformly with the transparent heater, the temperature in the vicinity of the driver circuit may be higher than in other places. In this case, the in-plane temperature distribution of the display panel is biased, and the response characteristics of the liquid crystal are also biased. As a result, the liquid crystal display device with the conventional transparent heater has a problem in that the display quality varies in a display screen due to the in-plane temperature distribution of the display panel.

An object of one embodiment of the present invention is to improve the in-plane temperature distribution of the display panel in the display device including a mechanism for heating the display panel.

Hereinafter, embodiments of the present invention will be described with reference to the drawings and the like. However, the present invention can be implemented in various aspects without departing from the gist thereof, and is not to be construed as being limited to the description of the embodiments exemplified below. Further, in order to clarify the description with respect to the drawings, the width, the thickness, the shape, and the like of each part may be schematically represented in comparison with the actual embodiment, but the schematic drawings are merely examples, and do not limit the interpretation of the present invention.

In the present specification and the drawings, elements that are the same as or similar to those described with respect to the above-described drawings are denoted by the same reference signs, and redundant descriptions thereof may be omitted. In this specification and the like, ordinal numbers are given for convenience in order to distinguish parts, members, and the like, and do not indicate priority or order. In addition, in the case where a plurality of identical elements is arranged and when it is necessary to distinguish individual elements, each element may be distinguished by adding a different letter of the alphabet after a reference sign indicating the element. However, when there is no need to distinguish each element, a letter of the alphabet may be omitted from a reference sign indicating an element.

In the case where a single film is processed to form a plurality of films in the present invention, the plurality of films may have different functions or roles. However, these films are derived from films formed as the same layer in the same process, and have the same layer structure and the same material. Therefore, the plurality of films is defined as being present in the same layer. In addition, in the case where a plurality of patterns is formed by processing a certain film, each pattern may be distinguished by adding an ordinal number in the present specification and the like.

In addition, expressions such as "above" and "below" represent a relative positional relationship between a structure of interest and other structures in this specification and the like. In the present specification and the like, in a side view, a direction from an array substrate to a counter substrate, which will be described later, is defined as "above", and a reverse direction thereof is defined as "below". In this specification and claims, the expression "above" in describing the manner of arranging another structure on a certain structure shall include both arranging another structure directly above a certain structure and arranging another structure above a certain structure via yet another structure, unless otherwise specified.

In each embodiment, the expression "a includes A, B or C," "a includes any of A, B or C," "a includes one selected from a group consisting of A, B and C" does not exclude the case where a includes a plurality of combinations of A to C unless otherwise indicated. Furthermore, these expressions do not exclude the case where a includes other elements.

First Embodiment

[Summary of Display Device]

FIG. 1 is a perspective view schematically showing a display device 10 according to an embodiment of the present invention. The display device 10 includes a display panel 102, a light source 104, a protective substrate 151A, and a protective substrate 151B as shown in FIG. 1. One direction of the plane in the display panel 102 is a direction D1, a direction orthogonal to the direction D1 is a direction D2, and a direction orthogonal to a D1-D2 plane is a direction D3, in FIG. 1.

The display panel 102 includes an array substrate 150, a counter substrate 152, a liquid crystal layer 210 between the array substrate 150 and the counter substrate 152 (see FIG. 2), a gate driving circuit 28, and a data driving circuit 38. Both the array substrate 150 and the counter substrate 152 have light transmittance in the present embodiment. Specifically, support substrates that serve as the base of both the array substrate 150 and the counter substrate 152 are transparent to visible light. The counter substrate 152 is arranged in the direction D3 to face the array substrate 150. The array substrate 150 and the counter substrate 152 are bonded to each other with a seal material 154 while being arranged opposite to each other with a gap therebetween. The liquid crystal layer 210 is arranged in the gap between the array substrate 150 and the counter substrate 152 as described above.

The array substrate 150 has a display region 12 and a peripheral region 14 located outside the display region 12. A plurality of gate wirings 16 (also referred to as a scanning signal line) is arranged in the direction D1, and a plurality of data wirings 17 (also referred to as a video signal line) is arranged in the direction D2 in the display region 12. A region surrounded by the gate wiring 16 and the data wiring 17 functions as a pixel 15. Therefore, a plurality of pixels 15 is arranged in the row direction and the column direction. In this case, the row direction refers to a direction parallel to the direction D1, and the column direction refers to a direction parallel to the direction D2. m pixels 15 are arranged in the row direction, and n pixels 15 are arranged in the column direction in the display region 12. The values of m and n are appropriately set depending on a display resolution in the vertical direction and a display resolution in the horizontal direction, respectively.

Each of the plurality of pixels 15 arranged in the display region 12 has a pixel circuit including a switching element formed by a thin film transistor (TFT). The pixel circuit includes the switching element and a capacity element, and controls on/off operations of each pixel 15. The thin film transistor is formed on the support substrate constituting the array substrate 150.

The gate driving circuit 28 and the data driving circuit 38 (which may be collectively referred to as a driver circuit) are arranged in the peripheral region 14 of the array substrate 150. Further, although not shown, a wiring group connecting the gate wiring 16 and the gate driving circuit 28, and a wiring group connecting the data wiring 17 and the data driving circuit 38 are arranged in the peripheral region 14. FIG. 1 shows an aspect in which the gate driving circuit 28 and the data driving circuit 38 are provided in an integrated circuit (IC) and mounted on the support substrate in a COG (Chip on Glass) method. However, the gate driving circuit 28 and the data driving circuit 38 may be mounted on the support substrate in a COF (Chip on Film) method, or may be formed on the support substrate by the thin film transistor in the same manner as the above-described pixel circuit.

The light source 104 is an elongated member that extends along the direction D1. For example, the light source 104 is composed of a plurality of light-emitting diodes (LED) arranged along the direction D1. The light source 104 may include an optical member such as a reflector, a diffuser, a lens, and the like, in addition to the light-emitting diode. In the present embodiment, a light emission timing of the light source 104 is controlled by a light emission control circuit 110 that is synchronized with the gate driving circuit 28 and the data driving circuit 38. Although an example in which the light emission control circuit 110 is mounted on the array substrate 150 using the COG method is shown in FIG. 1, the present invention is not limited to this example. For example, the light source 104 and the light emission control circuit 110 may be arranged as separate members (light-emitting units) independent of the display panel 102. In addition, the light emission control circuit 110 may also be incorporated into the gate driving circuit 28 or the driving circuit 38.

Figure 2:
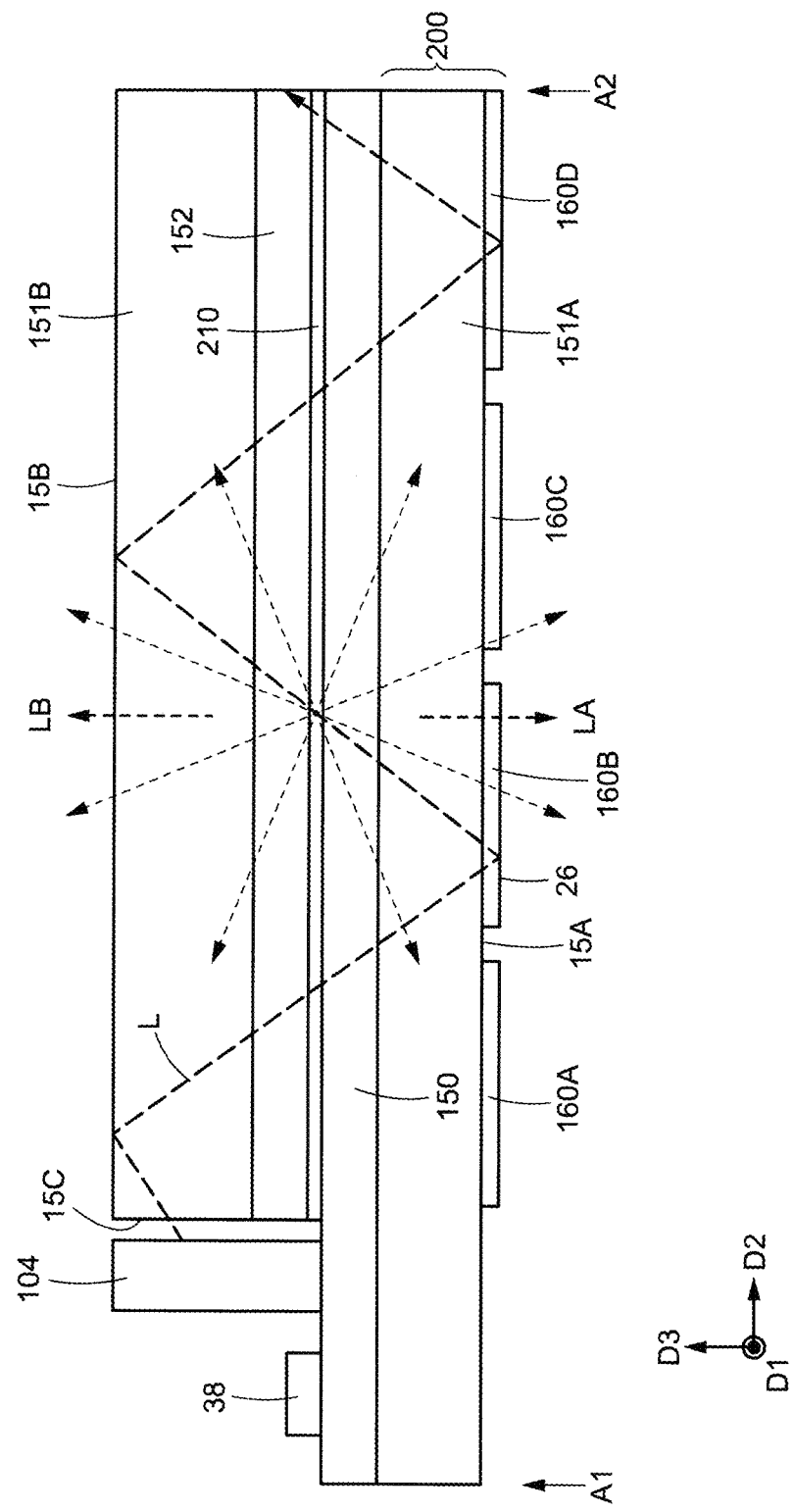
FIG. 2 is a cross-sectional view showing a configuration of a display device according to an embodiment of the present invention.

The protective substrates 151A and 151B are members that protect the display panel 102. The protective substrate 151A is arranged adjacent to the array substrate 150 and the protective substrate 151B is arranged adjacent to the counter substrate 152. The protective substrates 151A and 151B are composed of a substrate having light transmittance (for example, a glass substrate or a plastic substrate). The protective substrates 151A and 151B function as a light guide plate that guides light emitted from the light source 104 to the display panel 102, as shown in FIG. 2. Therefore, the protective substrates 151A and 151B preferably have refractive indices equivalent to those of the array substrate 150 and the counter substrate 152. The array substrate 150 and the protective substrate 151A, and the counter substrate 152 and the protective substrate 151B are fixed with an adhesive having light transmittance.

The display panel 102 is arranged such that the array substrate 150 and the counter substrate 152 face each other, and the liquid crystal layer 210 is arranged therebetween. The array substrate 150 is larger than the counter substrate 152 and has a size such that part of the peripheral region 14 is exposed from the counter substrate 152. Although not shown, a terminal part for attaching a flexible printed circuit substrate for supplying an external signal to the gate driving circuit 28 and the data driving circuit 38 is arranged at a peripheral portion of the array substrate 150.

In the present embodiment, the light source 104 is arranged adjacent to one side of the protective substrate 151A or 151B. The light source 104 is arranged above the array substrate 150 and is arranged adjacent to the side of the protective substrate 151B. Although FIG. 2 shows a configuration in which the light source 104 is attached to the array substrate 150, the configuration is not limited to this example, and any configuration may be used as long as the attachment position can be fixed. For example, the light source 104 may be supported by a housing surrounding the display panel 102.

FIG. 2 is a cross-sectional view showing a configuration of a display device according to an embodiment of the present invention. Specifically, FIG. 2 is a schematic cross-sectional view showing a configuration corresponding to a cross section between A1-A2 of the display device shown in FIG. 1. Most of the light L emitted from the light source 104 enters a side surface 15C of the protective substrate 151B, as shown in FIG. 2. The light L entering from the side surface 15C of the protective substrate 151B passes through the protective substrate 151A, the protective substrate 151B, and the display panel 102 and reaches an outer surface 15B of the protective substrate 151B or an outer surface 15A of the protective substrate 151A (or an outer surface 16 of the transparent electrode 160).

The light L will travel from a medium having a large refractive index to a medium having a small refractive index at the outer surface 15A of the protective substrate 151A (or the outer surface 16 of the transparent electrode 160) and the outer surface 15B of the protective substrate 151B. In the case where an incident angle of the light L incident on the outer surface 15A of the protective substrate 151A (or the outer surface 16 of the transparent electrode 160) and the outer surface 15B of the protective substrate 151B at this time is larger than the critical angle, the light L is totally reflected. That is, the light L that satisfies the total internal reflection condition travels toward the direction D2 while repeating the total internal reflection on the outer surface 15A of the protective substrate 151A (or the outer surface 16 of the transparent electrode 160) and the outer surface 15B of the protective substrate 151B.

The liquid crystal layer 210 is composed of polymer-dispersed liquid crystal. A scattered state and a non-scattered state of the liquid crystal layer 210 composed of the polymer-dispersed liquid crystal are controlled for each pixel 15.

In this case, "scattered state" refers to a state in which the liquid crystal molecules are oriented so that the light which has entered is scattered, and "non-scattered state" refers to a state in which the liquid crystal molecules are oriented so that the light which has entered passes through as it is without being scattered.

At least part of the light L traveling toward the direction D2 while passing through the display panel 102 is scattered when passing through a pixel in which the liquid crystal layer 210 is in the scattered state. In this case, part of the scattered light is emitted to the outside as scattered lights LA and LB without satisfying the above-described total internal reflection condition, and is observed by a user of the display device 10. Conversely, the scattered lights LA and LB do not occur in a pixel in which the liquid crystal layer 210 is in the non-scattered state, so that the light entering from the outside passes through the pixel and passes directly to the rear side (the side opposite to the side where the observer exists). That is, the user can view the rear side through the display device 10.

As described above, the display device 10 of the present embodiment displays an image to the user by causing the liquid crystal layer 210 of a particular pixel to be in the scattered state (for example, on-state) to emit the scattered lights LA and LB. In addition, since pixels other than the particular pixel are in the non-scattered state (for example, off-state), the scattered lights LA and LB do not occur, and the pixel is recognized as a transparent pixel by the user.

[Overview of Transparent Heater]

A plurality of transparent electrodes 160A to 160D is arranged apart from each other on the outer surface 15A of the protective substrate 151A in the display device 10 of the present embodiment as shown in FIG. 2. Although not shown, each of the plurality of transparent electrodes 160A to 160D is connected to a predetermined power source, and is configured so that a predetermined voltage can be applied (a predetermined amount of current can flow).

For example, the transparent electrodes 160A to 160D are light electrodes composed of a metal oxide having transmittance, such as ITO (Indium Tin Oxide). The electrode composed of the metal oxide has a higher resistance (resistance rate) than an electrode composed of a metal, and therefore generates heat when a current flows. However, each of the transparent electrodes 160A to 160D is not limited to the electrode composed of the metal oxide, and may be a transparent electrode using a wire grid (thin metal wire) or a carbon nanotube.

The plurality of transparent electrodes 160A to 160D can be used as a heating member for heating the display panel 102 in the present embodiment. The display device 10 of the present embodiment includes a transparent heater 200 composed of the protective substrate 151A (transparent substrate) and the plurality of transparent electrodes 160A to 160D, as described above. The transparent heater 200 can heat the display panel 102 by generating heat from the plurality of transparent electrodes 160A to 160D.

Figure 3:
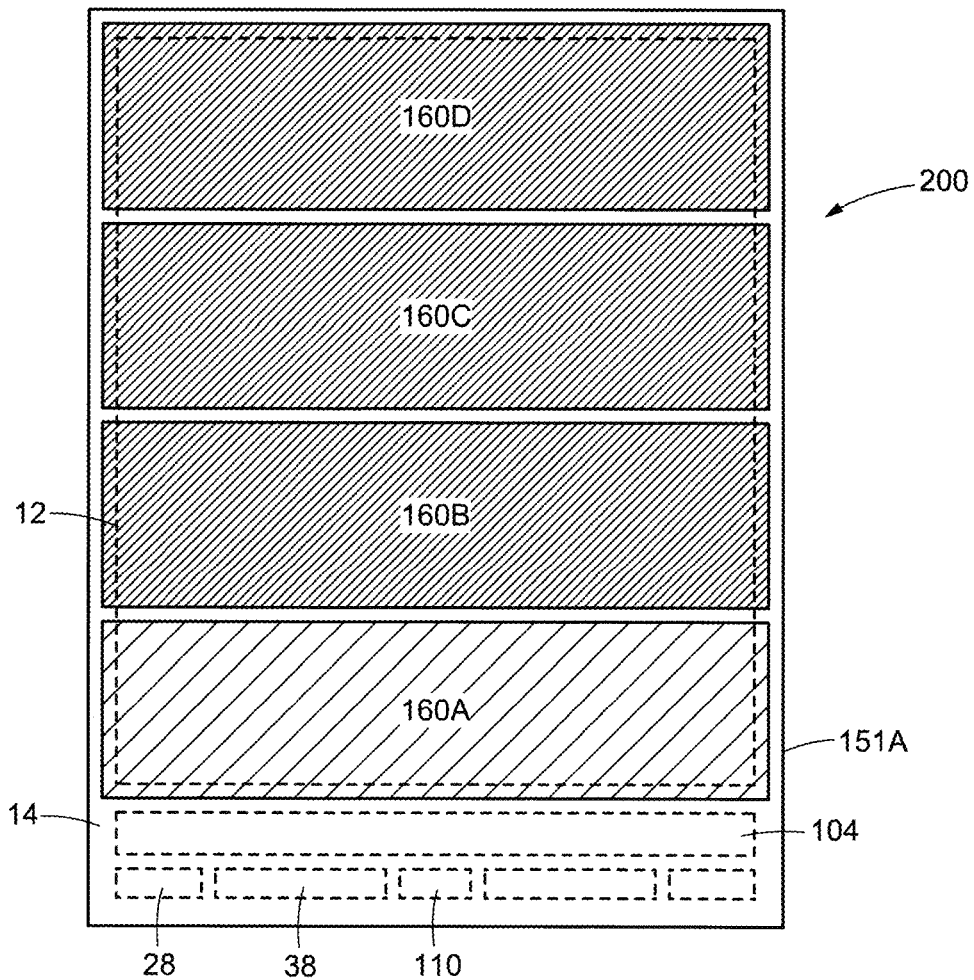
FIG. 3 is a rear view showing a configuration of a display device according to an embodiment of the present invention.

FIG. 3 is a rear view showing a configuration of the display device 10 according to an embodiment of the present invention. Specifically, FIG. 3 corresponds to a view in which the display device 10 is viewed from the side where the plurality of transparent electrodes 160A to 160D is arranged. The transparent heater 200 is composed of the protective substrate 151A and the plurality of transparent electrodes 160A to 160D. The plurality of transparent electrodes 160A to 160D whose longitudinal direction is the direction D1 is arranged in a stripe-like manner in the direction D2 as shown in FIG. 3 in the present embodiment.

However, the number of transparent electrodes 160 is not limited to four, and may be any number of two or more.

Although not shown, each of the transparent electrodes 160A to 160D is connected to a wiring for applying a voltage. Each of the transparent electrodes 160A to 160D may be connected to a separate wiring, or part of the transparent electrodes 160A to 160D may be connected to a common wiring. For example, in the case where each of the transparent electrodes 160A to 160D is connected to a different wiring and a different power source, different voltages can be applied to each of the transparent electrodes 160A to 160D independently. In addition, in the case where part of the transparent electrodes 160A to 160D is connected to the common wiring, the same voltage can be applied to the transparent electrode 160 connected to the common wiring.

In the present embodiment, the transparent electrodes 160B to 160D are connected by a common wiring to a first power source (not shown) capable of outputting a first voltage, and the transparent electrode 160A is connected by another wiring to a second power source (not shown) capable of outputting a second voltage lower than the first voltage. That is, in the present embodiment, the voltage applied to the transparent electrode 160A can be made lower than the voltage applied to the transparent electrodes 160B to 160D. As a result, the transparent electrode 160A is heated to a lower temperature than the transparent electrodes 160B to 160D.

The light source 104, the gate driving circuit 28, the data driving circuit 38, and the light emission control circuit 110 are arranged on one side of the display device 10 as shown in FIG. 3, and these elements act as the heat source. Therefore, the temperature of the display panel 102 in a region near the heat source is relatively higher than other regions. Therefore, in the present embodiment, the transparent electrode 160A arranged at a position closest to the heat source such as the light source 104, the driver circuit (the gate driving circuit 28, the data driving circuit 38), and the light emission control circuit 110 is heated at a lower temperature than the other transparent electrodes 160B to 160D among the plurality of transparent electrodes 160. With such a configuration, the display device 10 of the present embodiment can prevent the vicinity of the heat source from being excessively heated, thereby improving the in-plane temperature distribution of the display panel 102.

In addition, since there is a possibility that the vicinity of the heat source such as the light source 104 or the gate driving circuit 28 is excessively heated as described above, in the present embodiment the transparent electrode 160 is not arranged in a region overlapping the heat source in a plan view. For example, the plurality of transparent electrodes 160A to 160D is arranged at positions not overlapping the light source 104 and the driver circuit in a plan view as shown in FIG. 3.

Although an example in which the light source 104, the gate driving circuit 28, the data driving circuit 38, and the light emission control circuit 110 are arranged as the heat source has been described in the present embodiment, the present invention is not limited to this example. That is, the heating temperature of the transparent electrode arranged closest to the heat source (at least one element of the light source 104, the gate driving circuit 28, the data driving circuit 38, and the light emission control circuit 110) arranged on the array substrate 150 may be set lower than that of the other transparent electrodes in the display device 10 of the present embodiment.

In this case, since the liquid crystal layer 210 of the display device 10 of the present embodiment is composed of polymer-dispersed liquid crystal, a field-sequential method is used as a color-displaying method. The display panel needs to be driven at a high speed in the field-sequential method in order to irradiate lights of each color of RGB in time division. Therefore, in the case where the field-sequential method is used, a decrease in the response characteristics of the liquid crystal significantly affects the display quality. However, variations in the in-plane temperature distribution of the display panel 102 are also reduced while the display panel 102 is maintained at an appropriate temperature by the transparent heater 200 in the display device 10 of the present embodiment. Therefore, in the case where the display device 10 is used to perform a color display using the field-sequential method, degradation of the display quality can be suppressed.

Modification of First Embodiment

Although an example in which the transparent electrodes 160B to 160D are heated at the first temperature, and the transparent electrode 160A closest to the heat source is heated at the second temperature lower than the first temperature has been described in the first embodiment, the present invention is not limited to this example. For example, the transparent electrode 160 may be heated at three or more temperatures. Specifically, the transparent electrodes 160C and 160D may be heated at the first temperature, the transparent electrode 160B may be heated at the second temperature lower than the first temperature, and the transparent electrode 160A may be heated at a third temperature lower than the second temperature.

In addition, although an example in which the transparent electrode 160A closest to the heat source such as the light source 104 is heated at a lower temperature than the other transparent electrodes 160B to 160D has been described in the first embodiment, the present invention is not limited to this example. For example, the transparent electrodes 160C and 160D that are relatively far from the heat source may be heated at the first temperature, and the transparent electrodes 160A and 160B that are relatively close to the heat source may be heated at the second temperature lower than the first temperature.

The in-plane temperature distribution of the display panel 102 can be averaged in the display device 10 of the present embodiment by setting the heating temperature of each of the transparent electrodes 160A to 160D in view of the in-plane temperature distribution (for example, the temperature gradient) of the display panel 102 as described above.

Second Embodiment

A display device 10A having a configuration different from that of the first embodiment will be described in the present embodiment. Specifically, a transparent heater 200A is arranged so as to overlap the heat source in a plan view in the display device 10A of the present embodiment. Elements common to those of the first embodiment are denoted by the same reference signs as those of the first embodiment and detailed description thereof will be omitted in the present embodiment.

Figure 4:
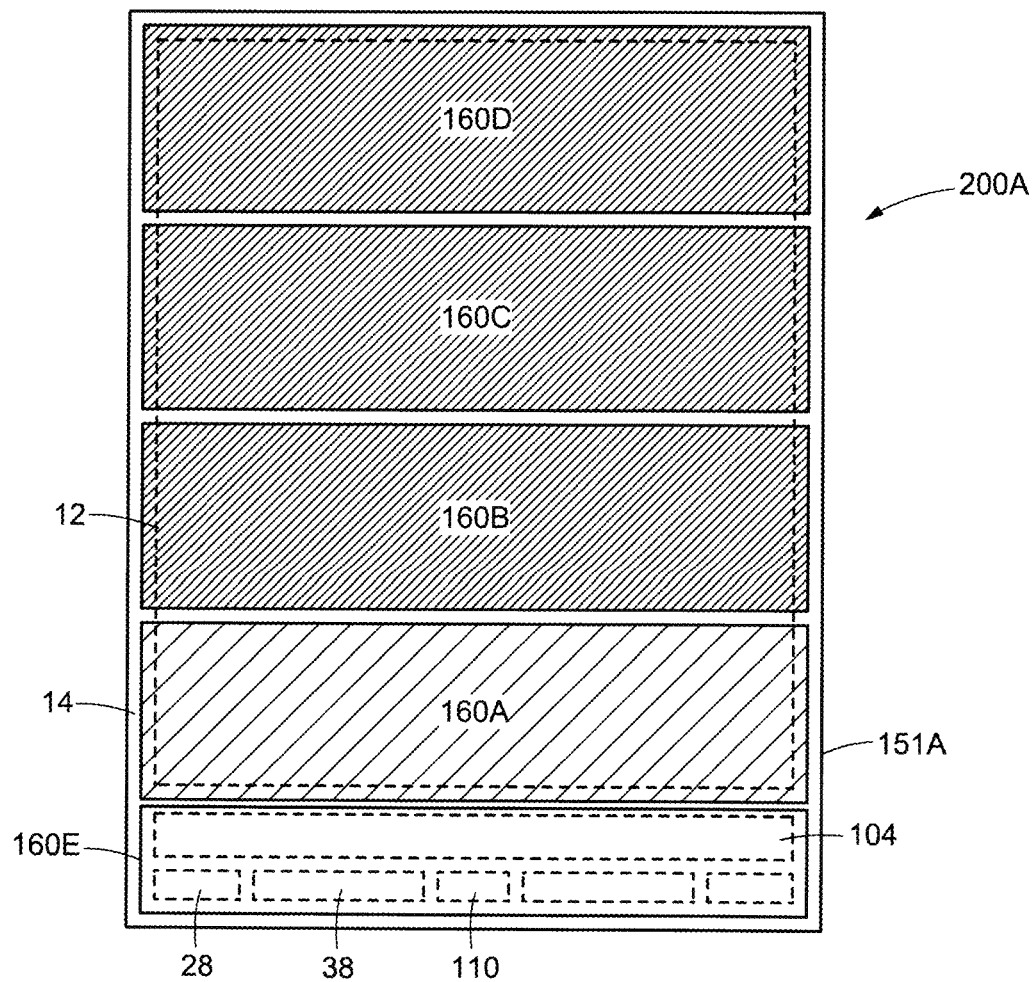
FIG. 4 is a rear view showing a configuration of a display device according to an embodiment of the present invention.

FIG. 4 is a rear view showing a configuration of the display device 10A according to an embodiment of the present invention. Specifically, FIG. 4 corresponds to a view in which the display device 10A is viewed from the side where the plurality of transparent electrodes 160A to 160E is arranged. The transparent heater 200A is composed of the protective substrate 151A and the plurality of transparent electrodes 160A to 160E.

The transparent heater 200A of the present embodiment includes the transparent electrode 160E in addition to the transparent electrodes 160A to 160D described in the first embodiment as shown in FIG. 4. The transparent electrode 160E is arranged to overlap the heat source such as the light source 104, the gate driving circuit 28, the data driving circuit 38, and the light emission control circuit 110 in a plan view.

The transparent electrode 160E functions as an auxiliary heating member in the present embodiment. For example, the transparent electrode 160E may be heated at a lower temperature than the transparent electrode 160A. That is, the transparent electrode 160E may be arranged as a member for heating a region where the heat source such as the light source 104 in the display panel 102 is arranged, in a situation where the amount of heat generated from the heat source such as the light source 104 is insufficient.

In addition, the transparent electrode 160E may not be heated. In other words, no voltage may be applied to the transparent electrode 160E when driving the transparent heater 200A. In this case, the transparent electrode 160E can function as an electromagnetic shield that protects the circuits, such as the gate driving circuit 28, the data driving circuit 38, and the light emission control circuit 110, from electromagnetic waves. In addition, it is preferable to arrange the transparent electrode 160 uniformly with respect to the protective substrate 151A in order to average stresses acting on the protective substrate 151A and external temperature.

Third Embodiment

A display device 10B having a configuration different from that of the first embodiment will be described in the present embodiment. Specifically, the display device 10B of the present embodiment includes a transparent heater 200B in which the plurality of transparent electrodes 160 is arranged in a matrix. Elements common to those of the first embodiment are denoted by the same reference signs as those of the first embodiment and detailed description thereof will be omitted in the present embodiment.

Figure 5:
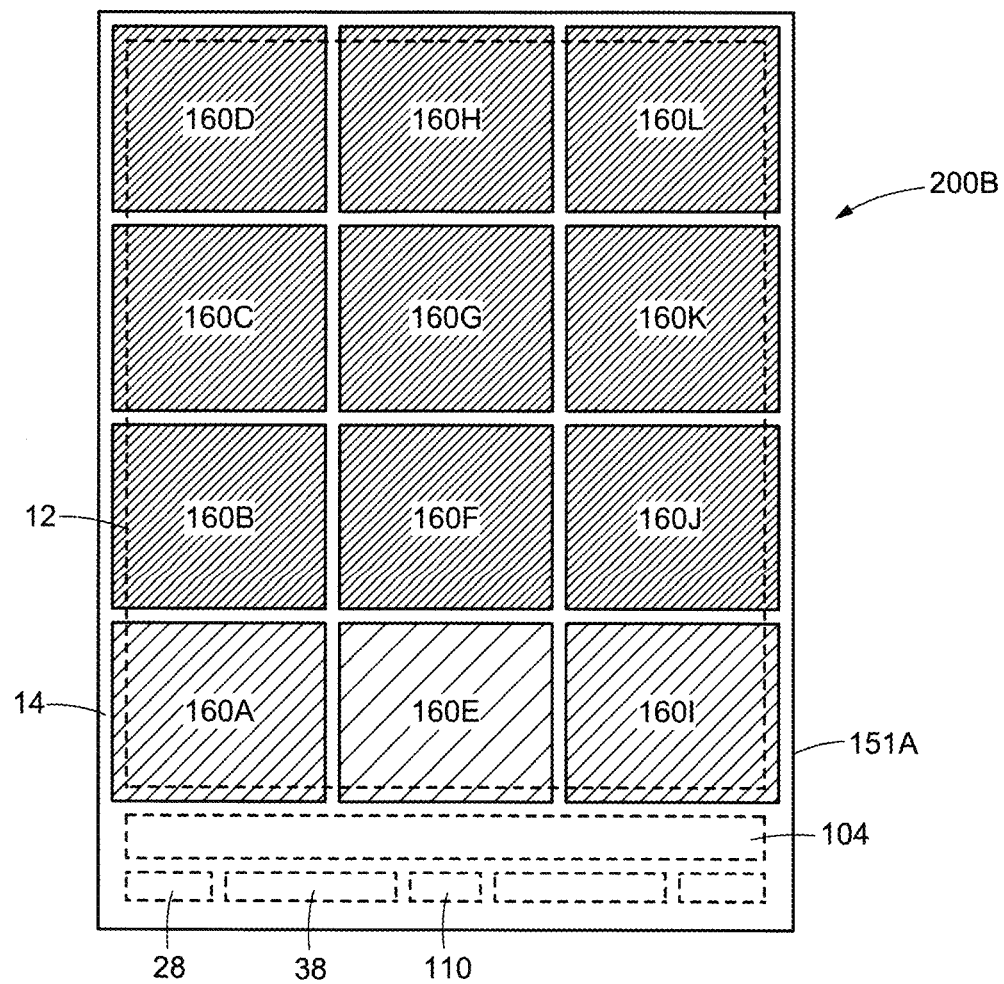
FIG. 5 is a rear view showing a configuration of a display device according to an embodiment of the present invention.

FIG. 5 is a rear view showing a configuration of the display device 10B according to an embodiment of the present invention. Specifically, FIG. 5 corresponds to a view in which the display device 10B is viewed from the side where the plurality of transparent electrodes 160A to 160L is arranged. The transparent heater 200B is composed of the protective substrate 151A and the plurality of transparent electrodes 160A to 160L.

In the present embodiment, twelve transparent electrodes 160A to 160L are arranged side by side in the row direction and the column direction as shown in FIG. 5. In the present embodiment, the transparent electrodes 160B to 160D, 160F to 160H and 160J to 160L are heated at the first temperature, the transparent electrodes 160A and 160I are heated at the second temperature lower than the first temperature, and the transparent electrode 160E is heated at the third temperature lower than the second temperature. In other words, the temperature of the transparent electrode 160E arranged at the position where the temperature is highest in the plane of the display panel 102 (the position closest to the heat source and closest to the center of the display panel 102) is set to be the lowest. The temperature of the transparent electrodes 160A and 160I arranged at the position where the temperature is next highest (the position closest to the heat source and close to an end portion of the display panel 102) is then set to be higher than that of the transparent electrode 160E and lower than that of the other transparent electrodes 160B to 160D, 160F to 160H and 160J to 160L.

Since the number of the transparent electrodes 160 constituting the transparent heater 200B in the display device 10B of the present embodiment is larger than those of the display device 10 of the first embodiment, the in-plane temperature distribution of the display panel 102 can be more finely and appropriately averaged. For example, although an example in which each transparent electrode 160 is heated at three temperatures has been shown in FIG. 5, more temperatures may be set. In addition, although an example in which the temperatures of the transparent electrodes 160B to 160D, 160F to 160H and 160J to 160L are set to the same temperature has been shown in FIG. 5, the present invention is not limited to this example, and at least some of the temperatures may be set differently from each other.

Fourth Embodiment

A display device 10C having a configuration different from that of the first embodiment will be described in the present embodiment. Specifically, a plurality of the light sources 104 is arranged, and the temperature of the transparent electrode 160 is adjusted depending on the positions of the plurality of the light sources 104 in the display device 10C of the present embodiment. Elements common to those of the first embodiment are denoted by the same reference signs as those of the first embodiment and detailed description thereof will be omitted in the present embodiment.

Figure 6:
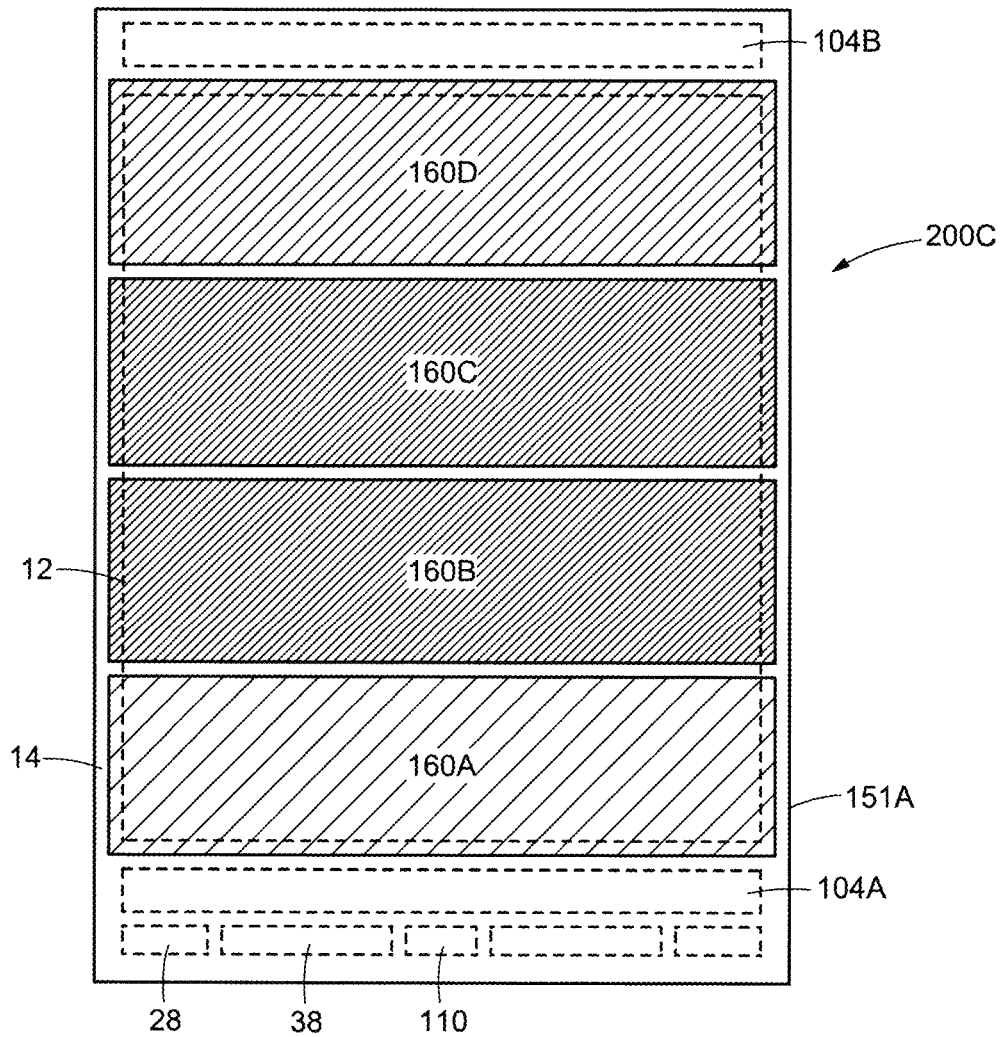
FIG. 6 is a rear view showing a configuration of a display device according to an embodiment of the present invention.

FIG. 6 is a rear view showing a configuration of the display device 10C according to an embodiment of the present invention. Specifically, FIG. 6 corresponds to a view in which the display device 10C is viewed from the side where the plurality of transparent electrodes 160A to 160D is arranged. A transparent heater 200C is composed of the protective substrate 151A and the plurality of transparent electrodes 160A to 160D.

Two light sources 104A and 104B are arranged along two opposite sides of the array substrate 150 in the display device 10C of the present embodiment as shown in FIG. 6. Specifically, the display device 10C includes the two light sources 104A and 104B opposed to each other via the display region 12. In other words, the light sources 104A and 104B are arranged adjacent to each of the two opposite side surfaces of the counter substrate 152.

Each of the light sources 104A and 104B is an elongated member whose longitudinal direction is the direction D1, and is composed of a plurality of light-emitting diodes arranged along the direction D1. The light sources 104A and 104B may be the same light source or may be light sources different from each other.

In the present embodiment, the temperature of the transparent electrode 160A closest to the light source 104A and the temperature of the transparent electrode 160D closest to the light source 104B are set to be lower than the other transparent electrodes 160B and 160C. Specifically, in the present embodiment, the transparent electrodes 160B and 160C are heated at the first temperature, the transparent electrode 160D is heated at the second temperature lower than the first temperature, and the transparent electrode 160A is heated at the third temperature lower than the second temperature.

The gate driving circuit 28, the data driving circuit 38, and the light emission control circuit 110 are adjacent to the region where the transparent electrode 160A is arranged in addition to the light source 104. Therefore, since the temperature of the region where the transparent electrode 160A is arranged is relatively higher than that of the other regions, the temperature of the transparent electrode 160A is set to be the lowest. On the other hand, only the light source 104B is adjacent to the region where the transparent electrode 160D is arranged. That is, since the temperature of the region where the transparent electrode 160D is arranged is relatively lower than that of the region where the transparent electrode 160A is arranged, the temperature of the transparent electrode 160D is set higher than that of the transparent electrode 160A.

In the present embodiment, in the case where the plurality of light sources 104 is arranged, the temperatures of the plurality of transparent electrodes 160 are appropriately set depending on the position of each of the light sources 104 as described above. With such a configuration, the display device 10C of the present embodiment can prevent the vicinity of the heat source from being excessively heated, thereby improving the in-plane temperature distribution of the display panel 102.

Modification of Fourth Embodiment

Although an example in which the two light sources 104A and 104B are arranged along two sides facing each other in the array substrate 150 has been described in the fourth embodiment, the present invention is not limited to this example. For example, the light source 104 may be arranged such that the two light sources 104 are orthogonal to each other along two orthogonal sides of the array substrate 150. Since the transparent electrode 160 close to the light source 104 needs to be selectively cooled in both the row direction and the column direction in this case, the plurality of transparent electrodes 160 is arranged in a matrix as shown in FIG. 5. In this case, the temperature of the transparent electrode 160 arranged in the region that is simultaneously affected by heat from the two light sources may be set lower than the temperature of the transparent electrode 160 arranged in the other regions.

Although an example in which the two light sources 104 are arranged has been described in the present embodiment, the present invention is not limited to this example, and three or four light sources 104 may be arranged.

Fifth Embodiment

Display devices 10D to 10H having a configuration different from that of the first embodiment will be described in the present embodiment. Specifically, the display devices 10D to 10H of the present embodiment are different from the first embodiment in that the positions where the plurality of transparent electrodes 160A to 160D constituting the transparent heaters are arranged are different. Elements common to those of the first embodiment are denoted by the same reference signs as those of the first embodiment and detailed description thereof will be omitted in the present embodiment.

Figure 7:
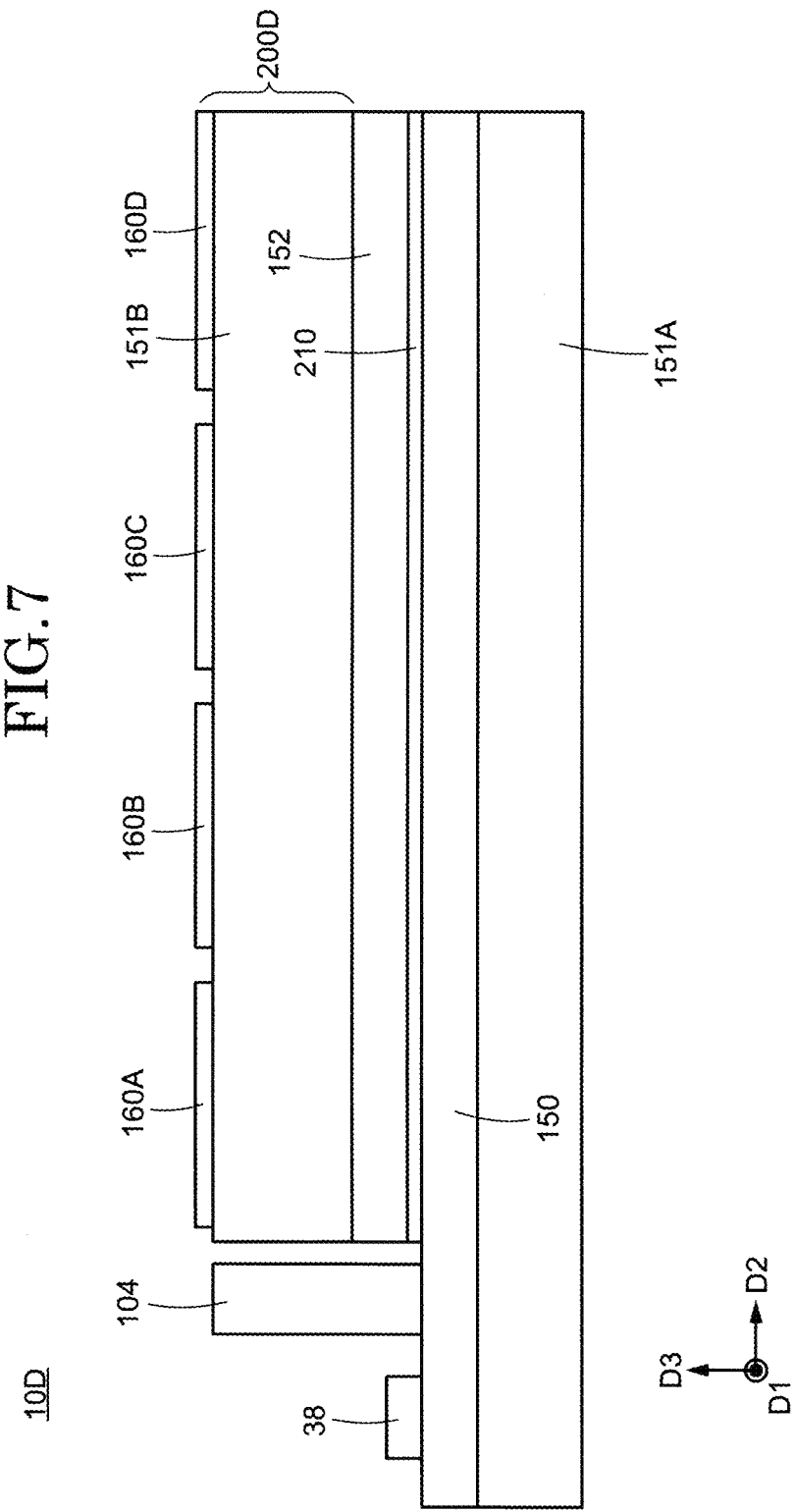
FIG. 7 is a cross-sectional view showing a configuration of a display device according to an embodiment of the present invention.

FIG. 7 is a cross-sectional view showing a configuration of the display device 10D according to an embodiment of the present invention. In the present embodiment, a transparent heater 200D is composed of the protective substrate 151B and the plurality of transparent electrodes 160A to 160D. The plurality of transparent electrodes 160A to 160D are arranged on the outer surface 15B of the protective substrate 151B as shown in FIG. 7. The transparent heater 200D can be arranged in the display panel 102 through a simple process of forming the transparent substrate 151B on the transparent electrodes 160A to 160D and then bonding the protective substrate 151B to the counter substrate 152 in the example shown in FIG. 7.

Figure 8:
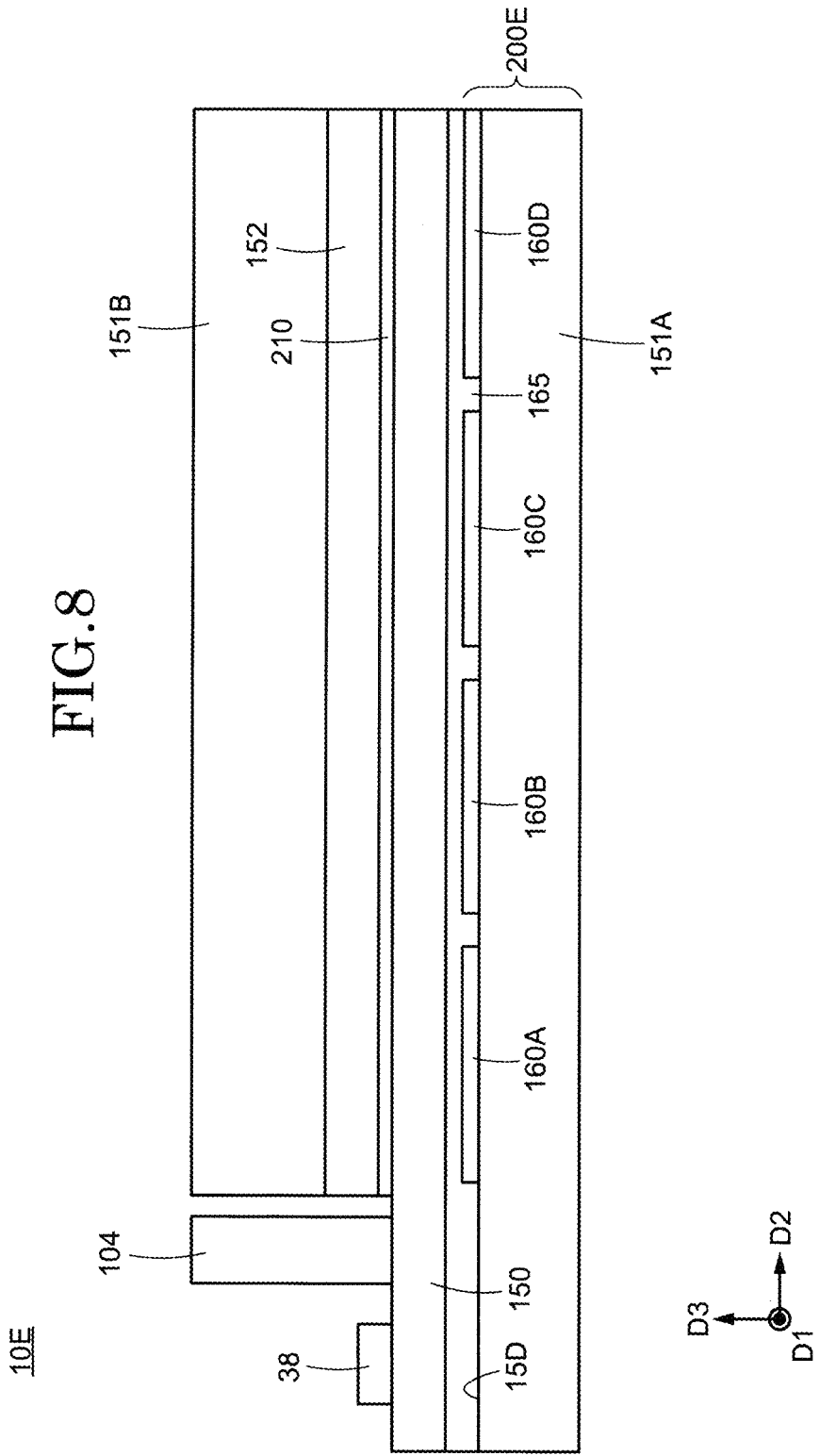
FIG. 8 is a cross-sectional view showing a configuration of a display device according to an embodiment of the present invention.

FIG. 8 is a cross-sectional view showing a configuration of the display device 10E according to an embodiment of the present invention. In the present embodiment, a transparent heater 200E is composed of the protective substrate 151A and the plurality of transparent electrodes 160A to 160D. The plurality of transparent electrodes 160A to 160D is arranged on an inner surface 15D of the protective substrate 151A as shown in FIG. 8. That is, the plurality of transparent electrodes 160A to 160D is arranged between the protective substrate 151A and the array substrate 150. The protective substrate 151A and the array substrate 150 are fixed by an adhesive layer 165 containing resin. The transparent heater 200E can be arranged in the display panel 102 through a simple process of forming the transparent electrodes 160A to 160D on the protective substrate 151A and then bonding the protective substrate 151A so that each transparent electrode 160 faces the array substrate 150 in the embodiment shown in FIG. 8.

Figure 9:
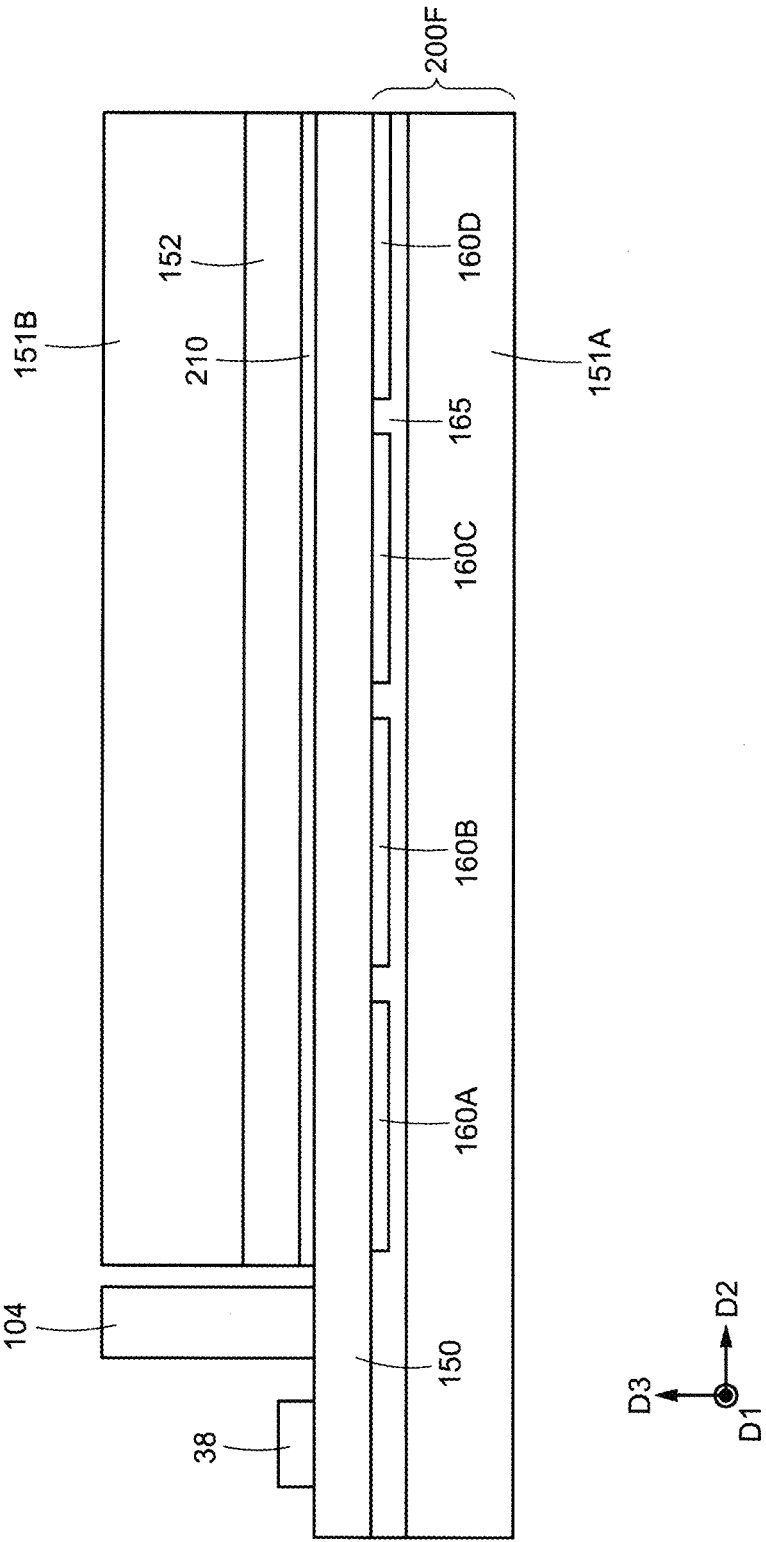
FIG. 9 is a cross-sectional view showing a configuration of a display device according to an embodiment of the present invention.

FIG. 9 is a cross-sectional view showing a configuration of the display device 10F according to an embodiment of the present invention. In the present embodiment, a transparent heater 200F is composed of the protective substrate 151A and the plurality of transparent electrodes 160A to 160D. The plurality of transparent electrodes 160A to 160D is arranged above the array substrate 150 as shown in FIG. 9. That is, the plurality of transparent electrodes 160A to 160D are arranged between the protective substrate 151A and the array substrate 150. The protective substrate 151A and the array substrate 150 are fixed by the adhesive layer 165 containing resin. The transparent heater 200F can be arranged in the display panel 102 through a simple process of bonding the protective substrate 151A to the array substrate 150 on which the transparent electrodes 160A to 160D are formed in the example shown in FIG. 9.

Figure 10:
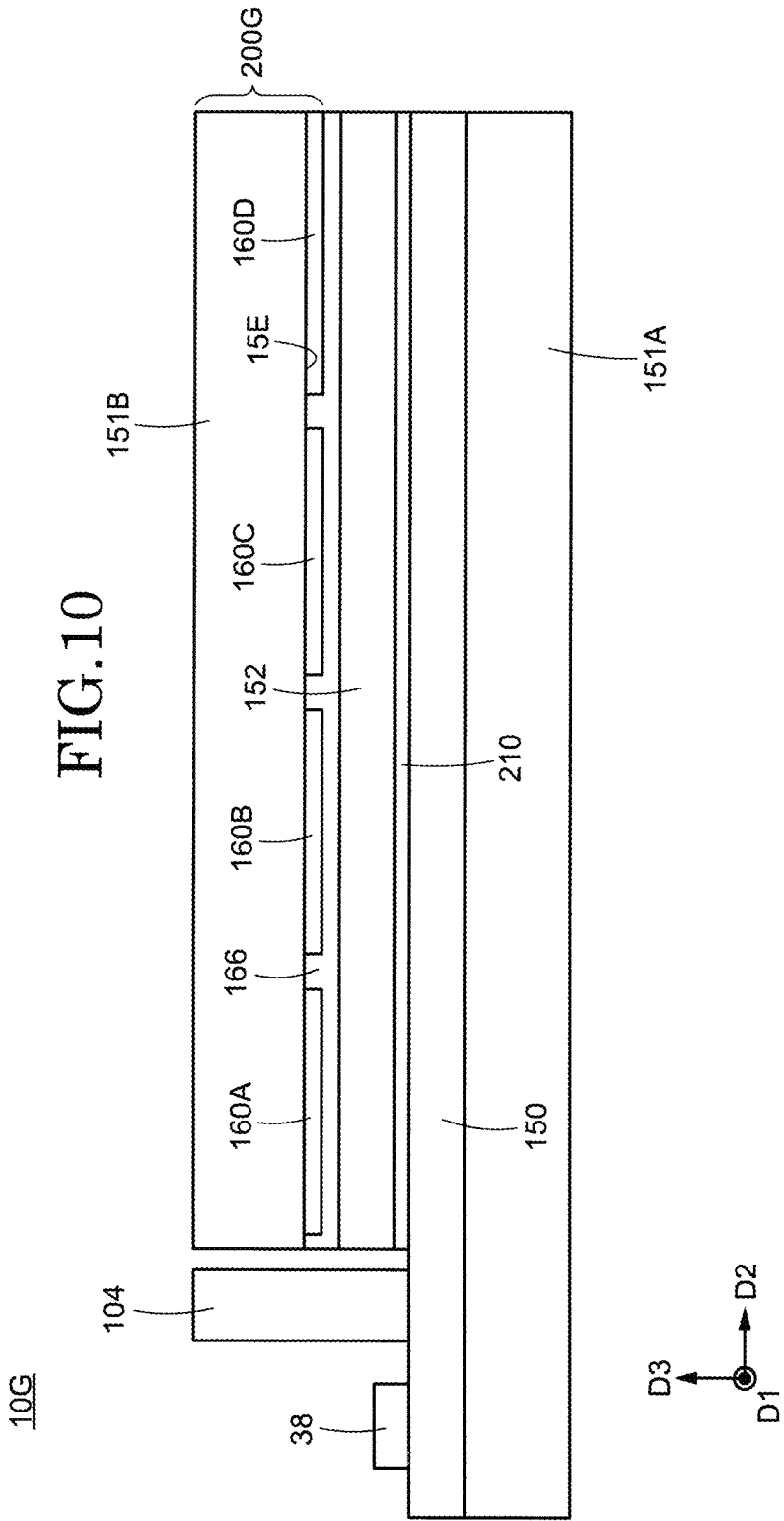
FIG. 10 is a cross-sectional view showing a configuration of a display device according to an embodiment of the present invention.

FIG. 10 is a cross-sectional view showing a configuration of the display device 10G according to an embodiment of the present invention. In the present embodiment, a transparent heater 200G is composed of the protective substrate 151B and the plurality of transparent electrodes 160A to 160D. The plurality of transparent electrodes 160A to 160D are arranged on an inner surface 15E of the protective substrate 151B as shown in FIG. 10. That is, the plurality of transparent electrodes 160A to 160D are arranged between the protective substrate 151B and the counter substrate 152. The protective substrate 151B and the counter substrate 152 are fixed by an adhesive layer 166 containing resin. The transparent heater 200G can be arranged in the display panel 102 through a simple process of forming the transparent electrodes 160A to 160D on the transparent electrode substrate 151B and then bonding the protective substrate 151B so that each transparent electrode 160 faces the array substrate 150 in the example shown in FIG. 10.

Figure 11:
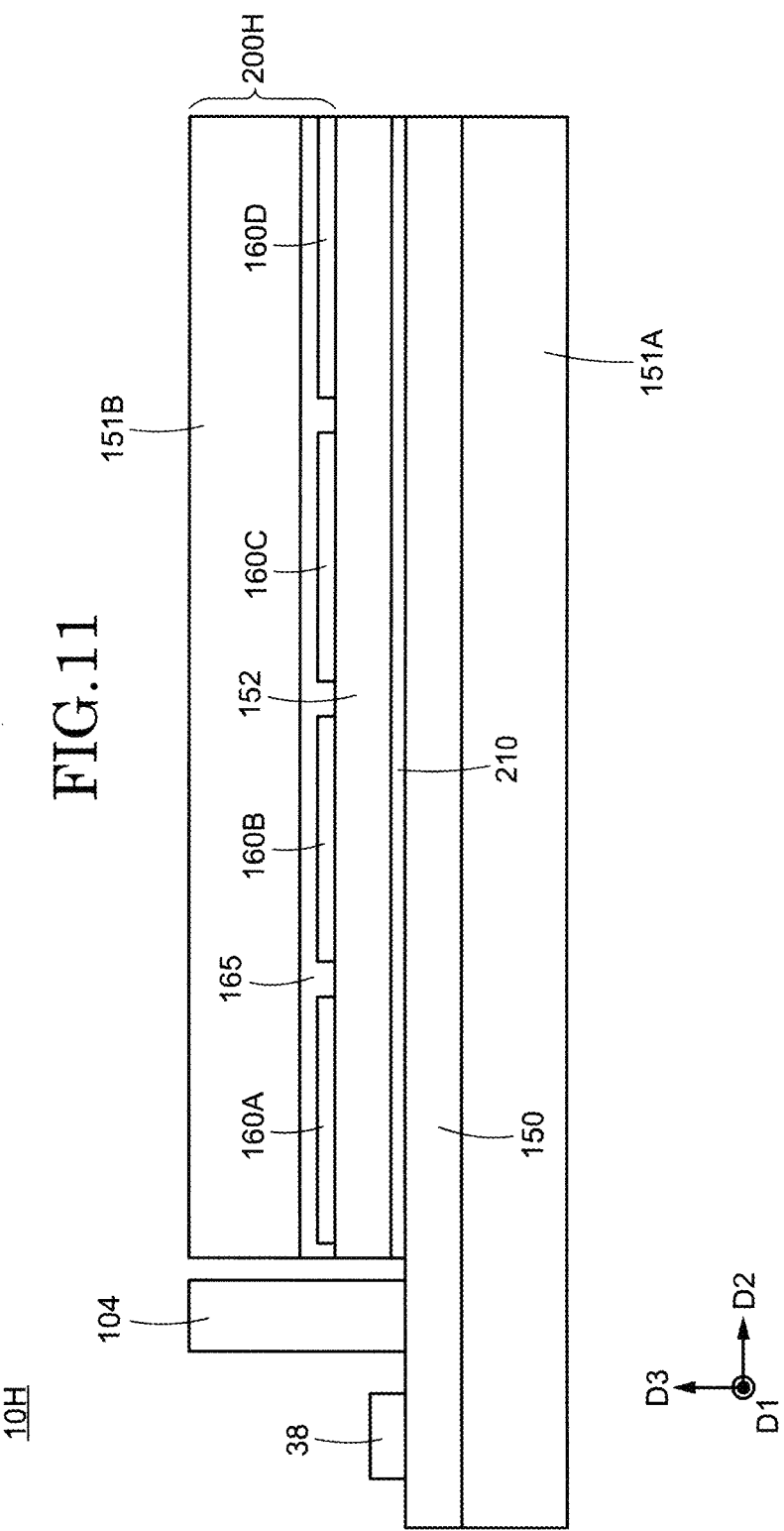
FIG. 11 is a cross-sectional view showing a configuration of a display device according to an embodiment of the present invention.

FIG. 11 is a cross-sectional view showing a configuration of the display device 10H according to an embodiment of the present invention. In the present embodiment, a transparent heater 200H is composed of the protective substrate 151B and the plurality of transparent electrodes 160A to 160D. The plurality of transparent electrodes 160A to 160D are arranged above the counter substrate 152 as shown in FIG. 11. That is, the plurality of transparent electrodes 160A to 160D are arranged between the protective substrate 151A and the counter substrate 152. The protective substrate 151A and the counter substrate 152 are fixed by the adhesive layer 166 containing resin. The transparent heater 200H can be arranged in the display panel 102 through a simple process of bonding the protective substrate 151B to the counter substrate 152 on which the transparent electrodes 160A to 160D are formed in the example shown in FIG. 11.

The transparent heater can be configured by arranging the plurality of transparent electrodes 160 in any one of the array substrate 150, the counter substrate 152, the protective substrate 151A, and the protective substrate 151B as described above. The substrate in which the transparent electrode 160 is arranged may be determined as appropriate in view of the manufacturing process of the display device.

Sixth Embodiment

A display device 10I having a configuration different from that of the first embodiment will be described in the present embodiment. Specifically, the display device 10I of the present embodiment includes a feedback mechanism for controlling the plurality of transparent electrodes 160A to 160D. Elements common to those of the first embodiment are denoted by the same reference signs as those of the first embodiment and detailed description thereof will be omitted in the present embodiment.

Figure 12:
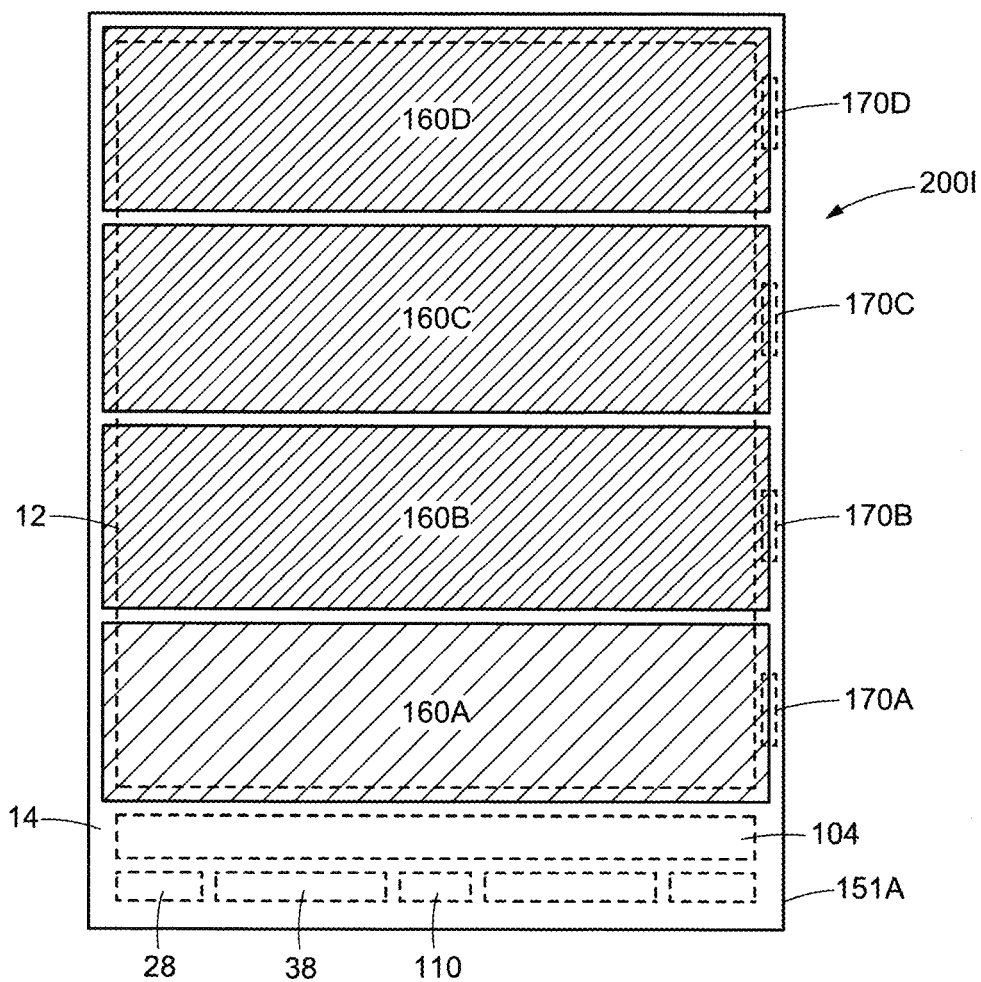
FIG. 12 is a rear view showing a configuration of a display device according to an embodiment of the present invention.
Figure 13:
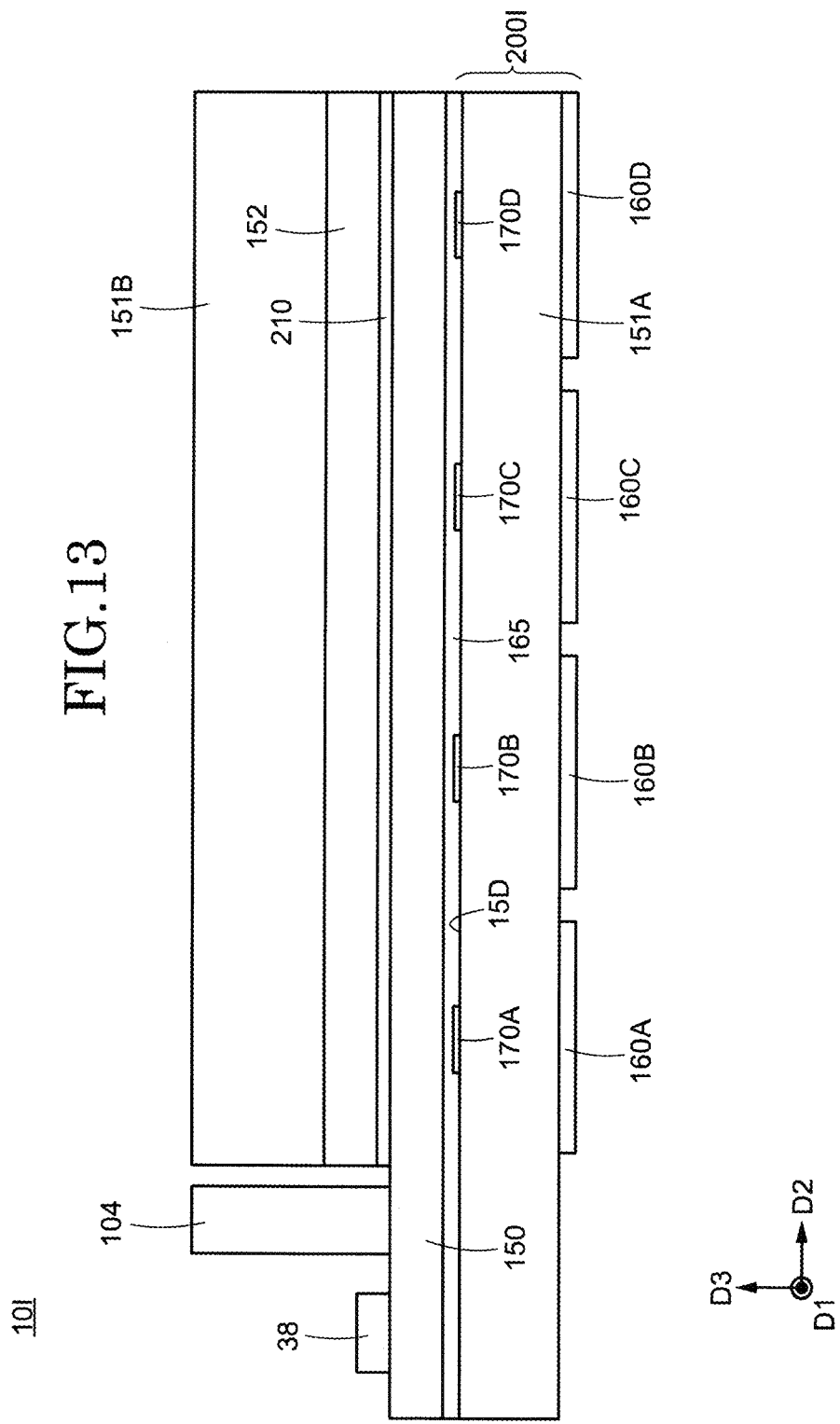
FIG. 13 is a cross-sectional view showing a configuration of a display device according to an embodiment of the present invention.

FIG. 12 is a rear view showing a configuration of the display device 10I according to an embodiment of the present invention. Specifically, FIG. 12 corresponds to a view in which the display device 10I is viewed from the side where the plurality of transparent electrodes 160A to 160D is arranged. FIG. 13 is a cross-sectional view showing a configuration of the display device 10I according to an embodiment of the present invention. A transparent heater 200I is composed of the protective substrate 151A and the plurality of transparent electrodes 160A to 160D.

In the present embodiment, sensors 170A to 170D are arranged corresponding to each of the plurality of transparent electrodes 160A to 160D as shown in FIG. 12. The sensors 170A to 170D are temperature sensors and are arranged on the inner surface 15D of the protective substrate 151A, as shown in FIG. 13. Therefore, the sensors 170A to 170D have a function for measuring the in-plane temperature distribution of the display panel 102. In the present embodiment, the sensor 170 is arranged in the peripheral region 14. The sensor 170 is preferably arranged at a position not overlapping the display region 12 so as not to interfere with the image display as described above. However, the present invention is not limited to this example, and the sensor 170 may be arranged in the display region 12.

In addition, the sensors 170A to 170D are arranged between the array substrate 150 and the protective substrate 151A as shown in FIG. 13. However, the present invention is not limited to this example, and the sensors 170A to 170D may be arranged between the counter substrate 152 and the protective substrate 151B. Further, although an example in which the sensor 170 is arranged in the protective substrate 151A has been shown in FIG. 13, the present invention is not limited to this example. For example, the sensors 170A to 170D may be arranged on the array substrate 150, the counter substrate 152, the protective substrate 151A, or the protective substrate 151B.

Although not shown, the display device 10I of the present embodiment includes a temperature control circuit connected to the transparent electrodes 160A to 160D and the sensors 170A to 170D. In the present embodiment, the temperature of the display panel 102 is measured using each of the sensors 170A to 170D and transmitted to the temperature control circuit described above. The temperature control circuit controls the temperature of each of the transparent electrodes 160A to 160D based on the measured temperature. That is, the display device 10H has a function of feeding back the measured data obtained by the sensors 170A to 170D to the temperature control of the transparent heater 200I. The display device 10I may lower the temperature of the transparent electrode 160 corresponding to a particular region when it is determined that the temperature in this region of the display panel 102 is high, or may raise the temperature of the transparent electrode 160 corresponding to a particular region when it is determined that the temperature in this region of the display panel 102 is low. As described above, the display device 10I can control the in-plane temperature distribution of the display panel 102 in a consistent manner by dynamically controlling the temperature of each of the transparent electrodes 160A to 160D based on the temperature of the display panel 102 measured by each of the sensors 170A to 170D.

Seventh Embodiment

A display device 10J having a configuration different from that of the first embodiment will be described in the present embodiment. Specifically, the heating temperature of a plurality of transparent electrodes 180A to 180D is varied depending on the thickness of each of the transparent electrodes 180A to 180D in the display device 10J of the present embodiment. Elements common to those of the first embodiment are denoted by the same reference signs as those of the first embodiment and detailed description thereof will be omitted in the present embodiment.

Figure 14:
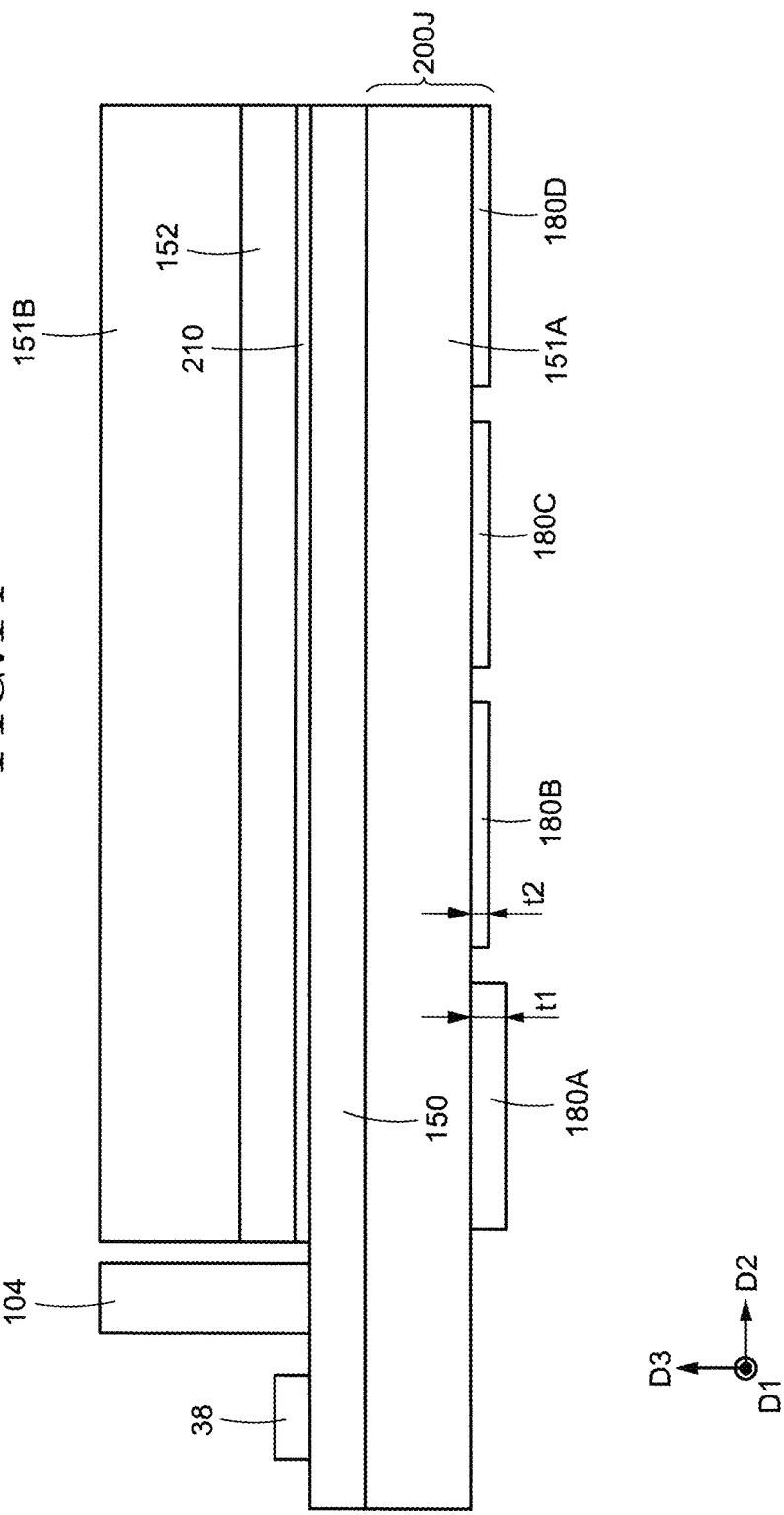
FIG. 14 is a cross-sectional view showing a configuration of a display device according to an embodiment of the present invention.

FIG. 14 is a cross-sectional view showing a configuration of the display device 10J according to an embodiment of the present invention. A transparent heater 200J is composed of the protective substrate 151A and the plurality of transparent electrodes 180A to 180D. In the present embodiment, a thickness of the transparent electrode 180A is t1, and a thickness of the transparent electrodes 180B to 180D is t2. In this case, there is a relationship of t1>t2 between the thickness t1 and the thickness t2, that is, the thickness of the transparent electrode 180A is larger than the thickness of the transparent electrodes 180B to 180D.

The same power source (not shown) is connected to the transparent electrodes 180A to 180D, and the same voltage is applied in this embodiment. In this case, since the transparent electrode 180A is thicker than the other transparent electrodes 180B to 180D, the resistance when the current flows is relatively smaller than that of the transparent electrodes 180B to 180D. That is, in the case where the same voltage is applied to the transparent electrodes 180A to 180D, Joule heat generated in the transparent electrode 180A is relatively smaller than that of the transparent electrodes 180B to 180D. As described above, the temperature of the transparent electrode 180A is set relatively low by making the thickness of the transparent electrode 180A closest to the heat source such as the light source 104 thicker than that of the other transparent electrodes 180B to 180D in the display device 10J.

As described above, in the present embodiment, controlling the thickness of the transparent electrode 180 depending on the set temperature makes it possible to heat the transparent electrodes 180A to 180D at a temperature corresponding to the position of the heat source. With such a configuration, the display device 10J of the present embodiment can prevent the vicinity of the heat source from being excessively heated, thereby improving the in-plane temperature distribution of the display panel 102.

Eighth Embodiment

Although an example in which the transparent heater 200 is configured by the protective substrate 151A and the transparent electrode 160 has been described in the above embodiments, the present invention is not limited to this example, and the heater may not be transparent. For example, an opaque substrate may be used as the protective substrate 151A, or an opaque electrode (an electrode composed of a metal layer or the like) may be used instead of the transparent electrode 160. However, it is desirable to increase resistance by reducing the thickness or narrowing the electrode width when an electrode composed of the metal layer is used as the heating member constituting the heater.

Ninth Embodiment

An example was explained in the above-described embodiments in which the temperature of the transparent electrode 160A close to the heat source is set lower than the temperature of the other transparent electrodes 160B to 160D. Such temperature control may be started when the transparent heater 200 is started, but is not limited to such an example. For example, the same voltage may be applied to the plurality of transparent electrodes 160A to 160D during a first period after the transparent heater 200 is activated. In this case, each of the transparent electrodes 160A to 160D is heated at the same temperature. Next, the voltage applied to the transparent electrode 160A may be made smaller than the voltage applied to the other transparent electrodes 160B to 160D in a second period following the first period. In this case, the transparent electrode 160A close to the heat source is heated at a relatively lower temperature than the other transparent electrodes 160B to 160D.

According to the present embodiment, since all the transparent electrodes 160 can be heated uniformly for a while by activating the transparent heater 200 to quickly raise the entire temperature, the temperature rise of the transparent heater 200 can be improved and the display quality of the display device 10 can be quickly improved.

Tenth Embodiment

A reference temperature of the transparent electrode 160 (the set temperature of the transparent electrode far from the heat source) may be set depending on the temperature of the external environment in each of the above-described embodiments. For example, a temperature control table may be arranged in which the reference temperature is associated with each air temperature, and the reference temperature of the transparent electrode 160 may be set with reference to the temperature control table based on the temperature of the external environment acquired by a sensor or the like. In this case, the transparent electrode 160 close to the heat source such as the light source 104 may be set to a temperature lower than the reference temperature.

In addition, if the reference temperature is changed, the overall temperature distribution of the transparent heater 200 may be changed. In this case, the plurality of sensors may be arranged so that the in-plane temperature distribution of the display panel 102 can be grasped as in the sixth embodiment, and the set temperature of each transparent electrode 160 may be adjusted by feeding back the output of each sensor. As a result, even if the reference temperature to be set in the transparent electrode 160 is changed depending on the temperature of the external environment, the in-plane temperature distribution of the display panel 102 can be improved by the feedback control using each sensor.

Eleventh Embodiment

Although a rectangular display panel is exemplified as the display panel 102 in the above embodiments, the shape of the display panel is not limited to the rectangular shape. For example, the display panel 102 may be a polygonal display panel or a non-rectangular display panel such as a circle. In addition, in the case where the polygonal display panel or the non-rectangular display panel is used as the display panel 102, it is desirable that the shape of each electrode constituting the transparent heater 200 is appropriately changed depending on the shape of the display panel 102. For example, in the case where the circular display panel is used as the display panel 102, the shape of each electrode may be designed so that the outer shape of each electrode is circular as a whole when each electrode constituting the transparent heater 200 is arranged side by side.

Each of the above-described embodiments (hereinafter, also including modifications) as an embodiment of the present invention can be appropriately combined and implemented as long as no contradiction is caused. Further, the addition, deletion, or design change of components, or the addition, deletion, or condition change of processes as appropriate by those skilled in the art based on each embodiment are also included in the scope of the present invention as long as they are provided with the gist of the present invention.

Further, it is understood that, even if the effect is different from those provided by each of the above-described embodiments, the effect obvious from the description in the specification or easily predicted by persons ordinarily skilled in the art is apparently derived from the present invention.

What is claimed is:
1. A display device comprising:
a display panel including a liquid crystal layer between a pair of substrates; and
a heater including a plurality of electrodes arranged at a distance from each other and arranged adjacent to the display panel, wherein
the plurality of electrodes includes a first electrode heated at a first temperature and a second electrode heated at a second temperature lower than the first temperature.
2. The display device according to claim 1, wherein
the plurality of electrodes are transparent electrodes, and
the heater is composed of a transparent substrate and the plurality of transparent electrodes.
3. The display device according to claim 1, wherein
the liquid crystal layer contains polymer-dispersed liquid crystals.
4. The display device according to claim 1 further comprising:
a light source arranged adjacent to at least one side of the pair of substrates, wherein
in a plan view, the second electrode is arranged closer to the light source than the first electrode.
5. The display device according to claim 4, wherein
the light source is arranged adjacent to each of two mutually opposing sides on at least one of the pair of substrates.

6. The display device according to claim 4, wherein
the plurality of electrodes is arranged so as to not overlap the light source in a plan view.

7. The display device according to claim 1, wherein
a driver circuit is arranged on at least one of the pair of substrates, and
in a plan view, the second electrode is arranged closer to the driver circuit than the first electrode.

8. The display device according to claim 7, wherein
the plurality of electrodes is arranged in a position that does not overlap the driver circuit in a plan view.

9. The display device according to claim 1, wherein
the plurality of electrodes is arranged in a stripe shape.

10. The display device according to claim 1, wherein
The plurality of electrodes is arranged in a matrix.

11. The display device according to claim 1, wherein
a first voltage is applied to the first electrode, and
a second voltage lower than the first voltage is applied to the second electrode.

12. The display device according to claim 1, wherein
a thickness of the second electrode is thicker than that of the first electrode, and
a common voltage is applied to the first and second electrodes.

13. The display device according to claim 1, wherein
the heater has a structure in which the plurality of electrodes is arranged on a substrate, and
the substrate is located between the display panel and the plurality of electrodes.

14. The display device according to claim 1, wherein
the heater has a structure in which the plurality of electrodes is arranged on a substrate, and
the plurality of electrodes is arranged between the display panel and the substrate.

15. The display device according to claim 1, wherein
a plurality of sensors is arranged in a position overlapping the display panel in a plan view, and
the temperatures of the first and second electrodes are controlled based on the outputs of the plurality of sensors.

16. A method for driving a display device having a display panel including a liquid crystal layer provided between a pair of substrates and a heater including a plurality of electrodes arranged at a distance from each other and adjacent to the display panel,
the method comprising:
applying a smaller voltage to a second electrode of the plurality of electrodes than to a first electrode of the plurality of electrodes.

17. The method for driving the display device according to claim 16, wherein
a plurality of sensors is arranged in a position overlapping the display panel in a plan view, and
the voltage applied to the first and second electrodes is controlled based on the outputs of the plurality of sensors.

18. The method for driving the display device according to claim 16, wherein
the same voltage is applied to each of the plurality of electrodes in a first period, and
the voltage applied to the second electrode is smaller than that applied to the first electrode in a second period following the first period.

* * * * *